(12) United States Patent
Seo et al.

(10) Patent No.: US 9,491,652 B2
(45) Date of Patent: Nov. 8, 2016

(54) METHOD AND APPARATUS FOR REPORTING A MEASUREMENT IN A WIRELESS COMMUNICATION SYSTEM

(75) Inventors: Inkwon Seo, Anyang-si (KR); Hanbyul Seo, Anyang-si (KR); Kijun Kim, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/234,920

(22) PCT Filed: Jul. 26, 2012

(86) PCT No.: PCT/KR2012/005962
§ 371 (c)(1),
(2), (4) Date: Jan. 24, 2014

(87) PCT Pub. No.: WO2013/015626
PCT Pub. Date: Jan. 31, 2013

(65) Prior Publication Data
US 2014/0192672 A1  Jul. 10, 2014

Related U.S. Application Data

(60) Provisional application No. 61/512,904, filed on Jul. 28, 2011.

(51) Int. Cl.
*H04W 24/10* (2009.01)
*H04L 5/00* (2006.01)
*H04B 17/318* (2015.01)
*H04B 17/24* (2015.01)

(52) U.S. Cl.
CPC .......... *H04W 24/10* (2013.01); *H04B 17/318* (2015.01); *H04L 5/0023* (2013.01); *H04L 5/0035* (2013.01); *H04L 5/0048* (2013.01); *H04B 17/24* (2015.01); *H04L 5/0057* (2013.01)

(58) Field of Classification Search
None
See application file for complete search history.

(56) References Cited

U.S. PATENT DOCUMENTS

2010/0322097 A1* 12/2010 Jen ................................ 370/252
2011/0039574 A1*  2/2011 Charbit ................. G01S 5/0215
455/456.1

(Continued)

FOREIGN PATENT DOCUMENTS

KR    1020110033079    3/2011
KR    1020110041972    4/2011

(Continued)

OTHER PUBLICATIONS

Zte, "Views on Rel-11 CoMP," 3GPP TSG RAN WG1 Meeting #63bis, R1-110172, Jan. 2011, 3 pages.

(Continued)

*Primary Examiner* — Hassan Kizou
*Assistant Examiner* — Tejis Daya
(74) *Attorney, Agent, or Firm* — Lee, Hong, Degerman, Kang & Walmey; Jonathan Kang; Michael Monaco

(57) ABSTRACT

The present invention relates to a method for reporting a measurement by a terminal, comprising the steps of: measuring the magnitude of a signal from a first transmission point; and measuring the magnitude of a signal from a second transmission point. The measurements of the magnitudes of the signals from each transmission point are performed using a channel state information reference signal.

9 Claims, 12 Drawing Sheets

(56) References Cited

U.S. PATENT DOCUMENTS

| | | | |
|---|---|---|---|
| 2011/0176634 A1* | 7/2011 | Yoon | H04L 5/0023 375/295 |
| 2011/0195706 A1* | 8/2011 | Nakamori | H04W 24/10 455/423 |
| 2011/0199986 A1* | 8/2011 | Fong | H04L 5/0035 370/329 |
| 2011/0292847 A1* | 12/2011 | Yoon | H04L 5/0007 370/280 |
| 2011/0319109 A1* | 12/2011 | Kang | H04L 5/001 455/507 |
| 2012/0020230 A1* | 1/2012 | Chen et al. | 370/252 |
| 2012/0076106 A1* | 3/2012 | Bhattad | H04L 5/0035 370/330 |
| 2013/0021925 A1* | 1/2013 | Yin | H04B 7/024 370/252 |
| 2013/0142156 A1* | 6/2013 | Mazzarese | H04L 5/0051 370/329 |
| 2013/0294338 A1* | 11/2013 | Zhang | H04W 24/02 370/328 |
| 2014/0247810 A1* | 9/2014 | Bontu | H04W 36/0094 370/332 |

FOREIGN PATENT DOCUMENTS

| | | |
|---|---|---|
| WO | 2010123270 | 10/2010 |
| WO | 2011079294 | 6/2011 |
| WO | 2011087252 | 7/2011 |

OTHER PUBLICATIONS

Ericsson, et al., "Aspects on Distributed RRUs with Shared Cell-ID for Heterogeneous Deployments," 3GPP TSG-RAN WG1 #64, R1-110649, Feb. 2011, 11 pages.

PCT International Application No. PCT/KR2012/005962, Written Opinion of the International Searching Authority dated Jan. 25, 2013, 17 pages.

* cited by examiner

FIG. 5
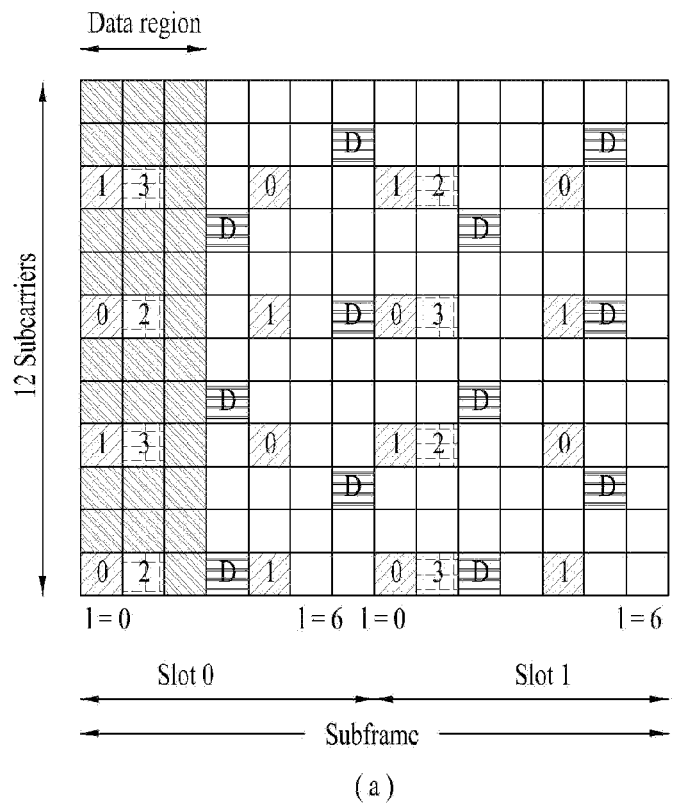
(a)
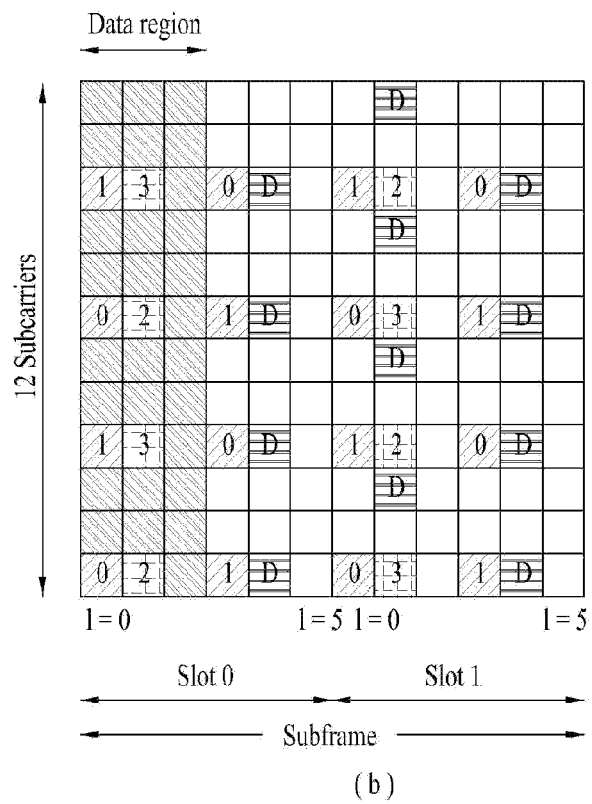
(b)

METHOD AND APPARATUS FOR REPORTING A MEASUREMENT IN A WIRELESS COMMUNICATION SYSTEM

CROSS-REFERENCE TO RELATED APPLICATIONS

This application is the National Stage filing under 35 U.S.C. 371 of International Application No. PCT/KR2012/005962, filed on Jul. 26, 2012, which claims the benefit of U.S. Provisional Application Ser. No. 61/512,904, filed on Jul. 28, 2011, the contents of which are all hereby incorporated by reference herein in their entirety.

TECHNICAL FIELD

The present invention relates generally to a wireless communication system, and more particularly, to a method and apparatus for reporting a measurement.

BACKGROUND ART

Wireless communication systems have been widely deployed in order to provide various types of communication services including voice or data. In general, a wireless communication system is a multiple access system that can support communication with multiple users by sharing available system resources (a bandwidth, transmission power, etc.). Examples of the multiple access system include Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi Carrier Frequency Division Multiple Access (MC-FDMA), etc.

DISCLOSURE

Technical Problem

An object of the present invention devised to solve the problem lies on measurement reporting and transmission point identification in relation to various reference signals, cell portioning, a handover procedure, and a random access procedure.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for performing measurement reporting at a User Equipment (UE) in a wireless communication system includes measuring the magnitude of a signal received from a first transmission point, and measuring the magnitude of a signal received from a second transmission point. The signal magnitude of a signal from each transmission point is measured using a Channel State Information-Reference Signal (CSI-RS).

In another aspect of the present invention, a UE for performing measurement reporting in a wireless communication system includes a reception module, and a processor. The processor measures the magnitude of a signal received from a first transmission point and the magnitude of a signal received from a second transmission point. The processor measures the signal magnitude of a signal from each transmission point using a CSI-RS.

The first to fourth technical aspects of the present invention may include the followings.

The first transmission point and the second transmission point may be included in a plurality of transmission points that perform cooperative transmission for the UE.

The first transmission point and the second transmission point may transmit CSI-RSs using different antenna ports.

The first transmission point and the second transmission point may transmit CSI-RSs according to different CSI-RS configurations.

The first transmission point and the second transmission point may transmit CSI-RSs according to different CSI-RS subframe configurations.

The first transmission point and the second transmission point may be located in a neighbor cell of a cell to which the UE belongs. A transmission point of the cell to which the UE belongs may transmit information about an antenna port used for transmitting a CSI-RS by each transmission point to the UE. Or a transmission point of the cell to which the UE belongs may transmit a CSI-RS configuration used for transmitting a CSI-RS by each transmission point to the UE. Or a transmission point of the cell to which the UE belongs may transmit a CSI-RS subframe configuration used for transmitting a CSI-RS by each transmission point to the UE.

The magnitude of a signal may be measured by calculating a linear average of power of resource elements carrying an RS.

The magnitude of a signal may be measured by calculating a linear average of power of resource elements carrying an RS, total reception power, and the number of resource blocks in a corresponding bandwidth, used for measuring the total reception power.

Advantageous Effects

According to the present invention, measurement reporting and its related procedures can be efficiently performed.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 5 is a view referred to for describing Reference Signals (RSs);

BEST MODE

Figure 1:
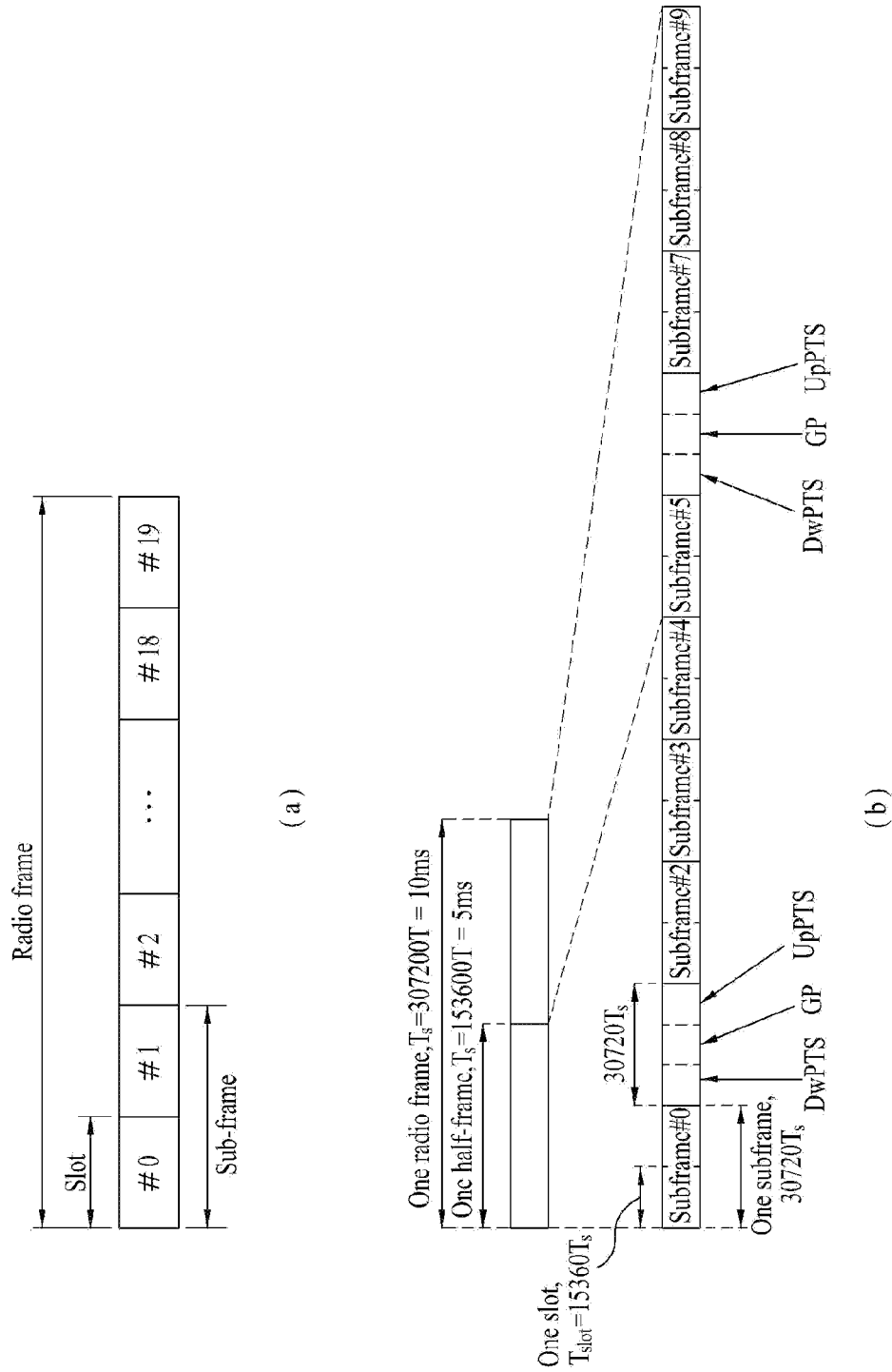
FIG. 1 illustrates a structure of a downlink radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802, 3$^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for Downlink (DL) and SC-FDMA for Uplink (UL). LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, the present disclosure focuses on the 3GPP LTE and LTE-A systems. However, the technical features of the present invention are not limited thereto.

With reference to FIG. 1, the structure of a radio frame will be described below.

In a cellular Orthogonal Frequency Division Multiplexing (OFDM) wireless packet communication system, UL and/or DL data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(*a*) illustrates the type-1 radio frame structure. A FL radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for DL, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot may include 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, as is the case with fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control Channel (PDCCH) and the other OFDM symbols may be allocated to a Physical Downlink Shared Channel (PDSCH).

FIG. 1(*b*) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of UL transmission synchronization to a UE at an eNB. The GP is a period between a UL and a DL, which eliminates UL interference caused by multipath delay of a DL signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
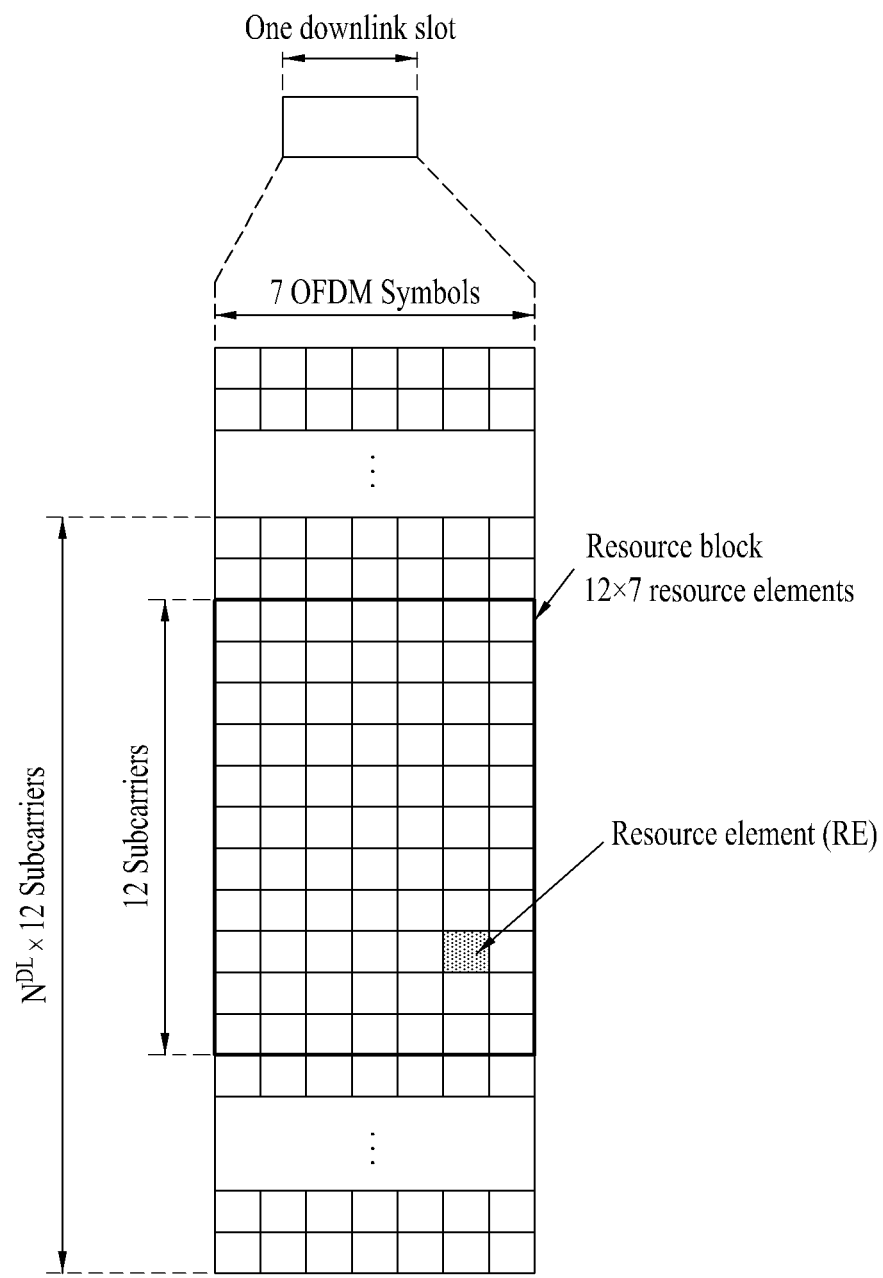
FIG. 2 illustrates a resource grid for the duration of one downlink slot.

FIG. 2 illustrates the structure of a DL resource grid for the duration of one DL slot. A DL slot includes 7 OFDM symbols in the time domain and an RB includes 12 subcarriers in the frequency domain, which does not limit the scope and spirit of the present invention. For example, a DL slot may include 7 OFDM symbols in the case of the normal CP, whereas a DL slot may include 6 OFDM symbols in the case of the extended CP. Each element of the resource grid is referred to as a Resource Element (RE). An RB includes 12×7 REs. The number of RBs in a DL slot, $N^{DL}$ depends on a DL transmission bandwidth. A UL slot may have the same structure as a DL slot.

Figure 3:
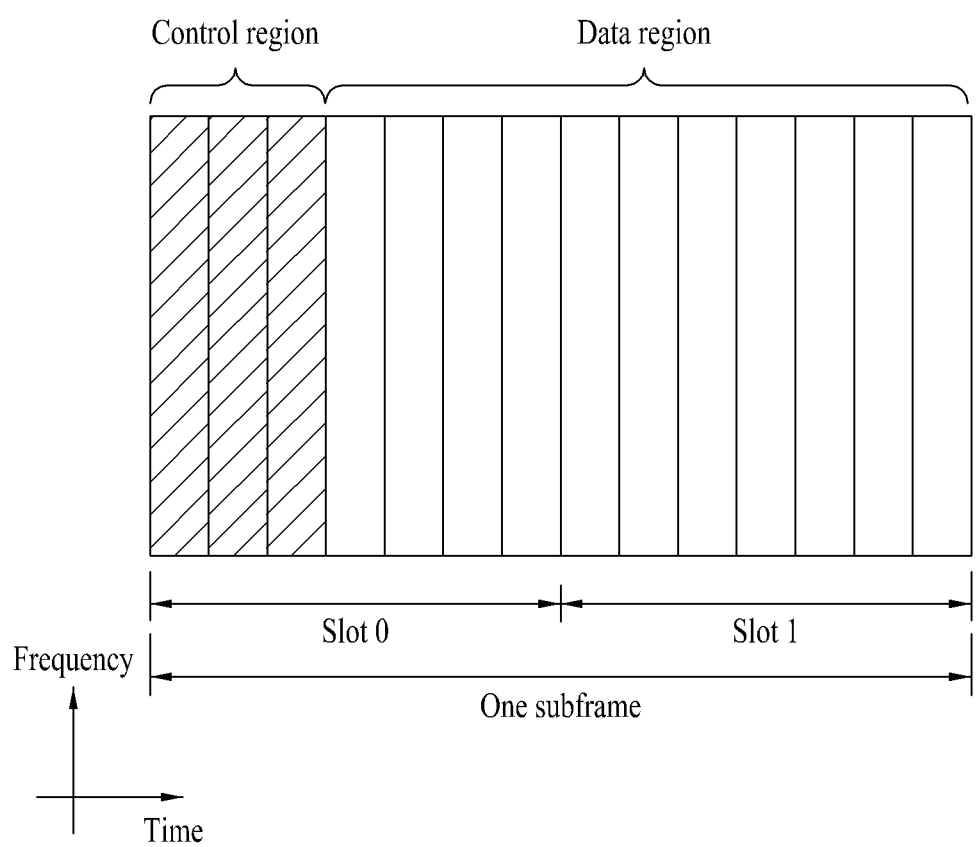
FIG. 3 illustrates a structure of a downlink subframe.

FIG. 3 illustrates the structure of a DL subframe. Up to three OFDM symbols at the start of the first slot in a DL subframe are used for a control region to which control channels are allocated and the other OFDM symbols of the DL subframe are used for a data region to which a PDSCH is allocated. DL control channels used in the 3GPP LTE system include a Physical Control Format Indicator Channel (PCFICH), a Physical Downlink Control Channel (PDCCH), and a Physical Hybrid automatic repeat request (HARQ) Indicator Channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to a UL transmission. Control information carried on the PDCCH is called Downlink Control Information (DCI). The DCI transports UL or DL scheduling information, or UL transmission power control commands for UE groups. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is transmitted in an aggregate of one or more consecutive Control Channel Elements (CCEs). A CCE is a logical allocation unit used to provide a PDCCH at a coding rate based on the state of a radio channel. A CCE includes a plurality of RE Groups (REGs). The format of a PDCCH and the number of available bits for the PDCCH are determined according to the correlation between the number of CCEs and a coding rate provided by the CCEs. An eNB determines a PDCCH format according to DCI transmitted to a UE and adds a Cyclic Redundancy Check (CRC) to the control information. The CRC is masked by an Identifier (ID) known as a Radio Network Temporary Identifier (RNTI) according to the owner or usage of the PDCCH. If the PDCCH is directed to a specific UE, its CRC may be masked by a Cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
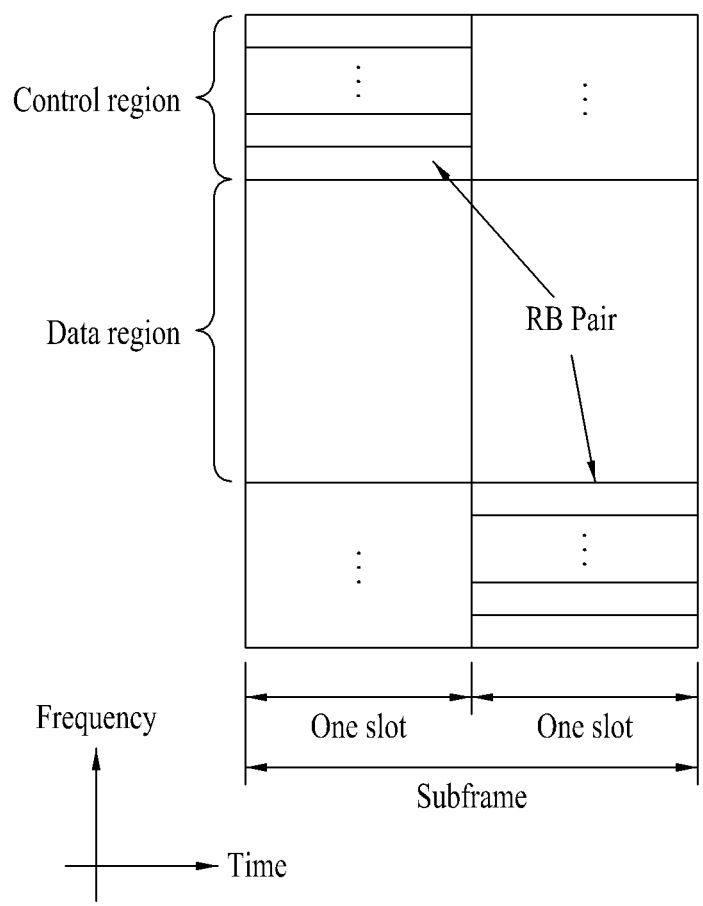
FIG. 4 illustrates a structure of an uplink subframe.

FIG. 4 illustrates the structure of a UL subframe. A UL subframe may be divided into a control region and a data region in the frequency domain. A Physical Uplink Control Channel (PUCCH) carrying Uplink Control Information (UCI) is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna, particularly through each antenna port.

RSs may be divided into DL RSs and UL RSs. In the current LTE system, the UL RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of a UL channel in a different frequency.

The DL RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when DL DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires DL channel information, the former should be transmitted in a broad band and received even by a UE that does not receive DL data in a specific subframe. This RS is also used in a situation like handover. The latter is an RS that an eNB transmits along with DL data in specific resources. A UE can demodulate the data by measuring a channel using the RS. This RS should be transmitted in a data transmission area.

CRS serves two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna port 0 and antenna port 1 are transmitted. In the case of four Tx antennas, CRSs for antenna port 0 to antenna port 3 are respectively transmitted.

Figure 7:
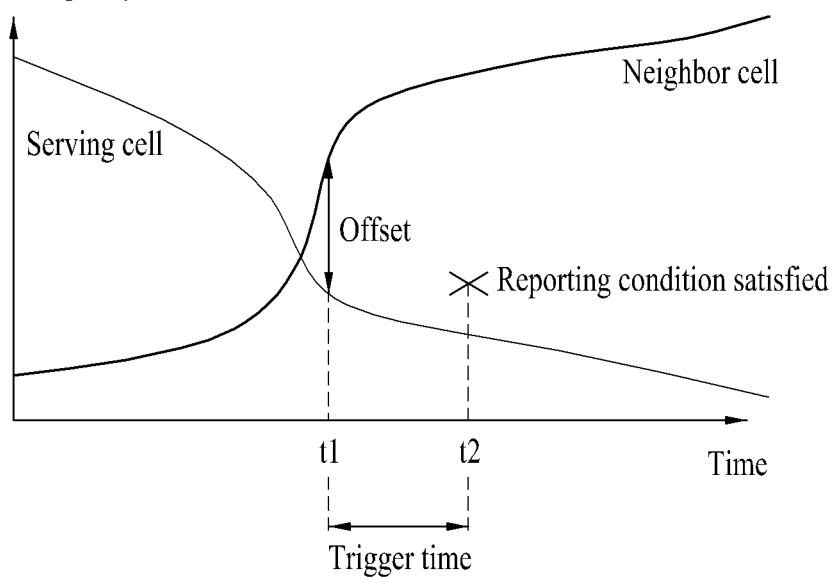
FIG. 7 is a view referred to for describing determination as to whether to transmit a measurement report.

FIG. 7 illustrates patterns in which CRSs and DRSs are mapped to a DL RB pair, as defined in a legacy 3GPP LTE system (e.g. conforming to Release-8). An RS mapping unit, i.e. a DL RB pair may include one subframe in time by 12 subcarriers in frequency. That is, an RB pair includes 14 OFDM symbols in time in the case of the normal CP (see FIG. 7(a)) and 12 OFDM symbols in time in the case of the extended CP (see FIG. 7(b)).

In FIG. 7, the positions of RSs in an RB pair for a system where an eNB supports four Tx antennas are illustrated. Reference numerals '0', '1', '2' and '3' denote the REs of CRSs for antenna port 0 to antenna port 3, respectively, and reference character 'D' denotes the positions of DMRSs.

CSI-RS

CSI-RS is an RS used for channel measurement in an LTE-A system supporting up to eight antenna ports on DL. CSI-RS differs in this aspect from CRS used for both channel measurement and data demodulation and thus it is not necessary to transmit CSI-RSs in every subframe like CRSs. CSI-RS is used in transmission mode 9. For data demodulation, DMRS is used.

More specifically, CSI-RSs may be transmitted through 1, 2, 4 or 8 antenna ports. Antenna port 15 may be used for one antenna port, antenna port 15 and antenna port 16 for two antenna ports, antenna port 15 to antenna port 18 for four antenna ports, and antenna port 15 to antenna port 22 for eight antenna ports.

CSI-RSs may be generated by the following [Equation 1].

$$r_{l,n_s}(m) = \frac{1}{\sqrt{2}}(1 - 2\cdot c(2m)) + j\frac{1}{\sqrt{2}}(1 - 2\cdot c(2m+1)), \quad \text{[Equation 1]}$$
$$m = 0, 1, \ldots, N_{RB}^{max,DL} - 1$$

where $r_{l,n_s}(m)$ denotes the generated CSI-RSs, $c(i)$ denotes a pseudo-random sequence, $n_s$ is a slot number, $l$ is an OFDM symbol index, and $N^{max,DL}_{RB}$ is a maximum number of RBs in a DL bandwidth.

The CSI-RSs generated by [Equation 1] may be mapped to REs on a per-antenna port basis by the following equation.

$$a_{k,l}^{(p)} = w_{l''} \cdot r_{l,n_s}(m') \quad \text{[Equation 2]}$$

$$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' +
\begin{cases}
l'' & \text{CSI reference signal configurations 0-19,} \\
& \text{normal cyclic prefix} \\
2l'' & \text{CSI reference signal configurations 20-31,} \\
& \text{normal cyclic prefix} \\
l'' & \text{CSI reference signal configurations 0-27,} \\
& \text{extended cyclic prefix}
\end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In [Equation 2], k' and l' may be determined according to CSI-RS configurations as illustrated in [Table 1].

TABLE 1

| | CSI reference signal configuration | Number of CSI reference signal configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |

TABLE 1-continued

| | CSI reference signal configuration | Number of CSI reference signal configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame | 20 | (11, 1) | 1 | (11, 1) | 1 | (11, 1) | 1 |
| structure | 21 | (9, 1) | 1 | (9, 1) | 1 | (9, 1) | 1 |
| type 2 only | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Figure 6:
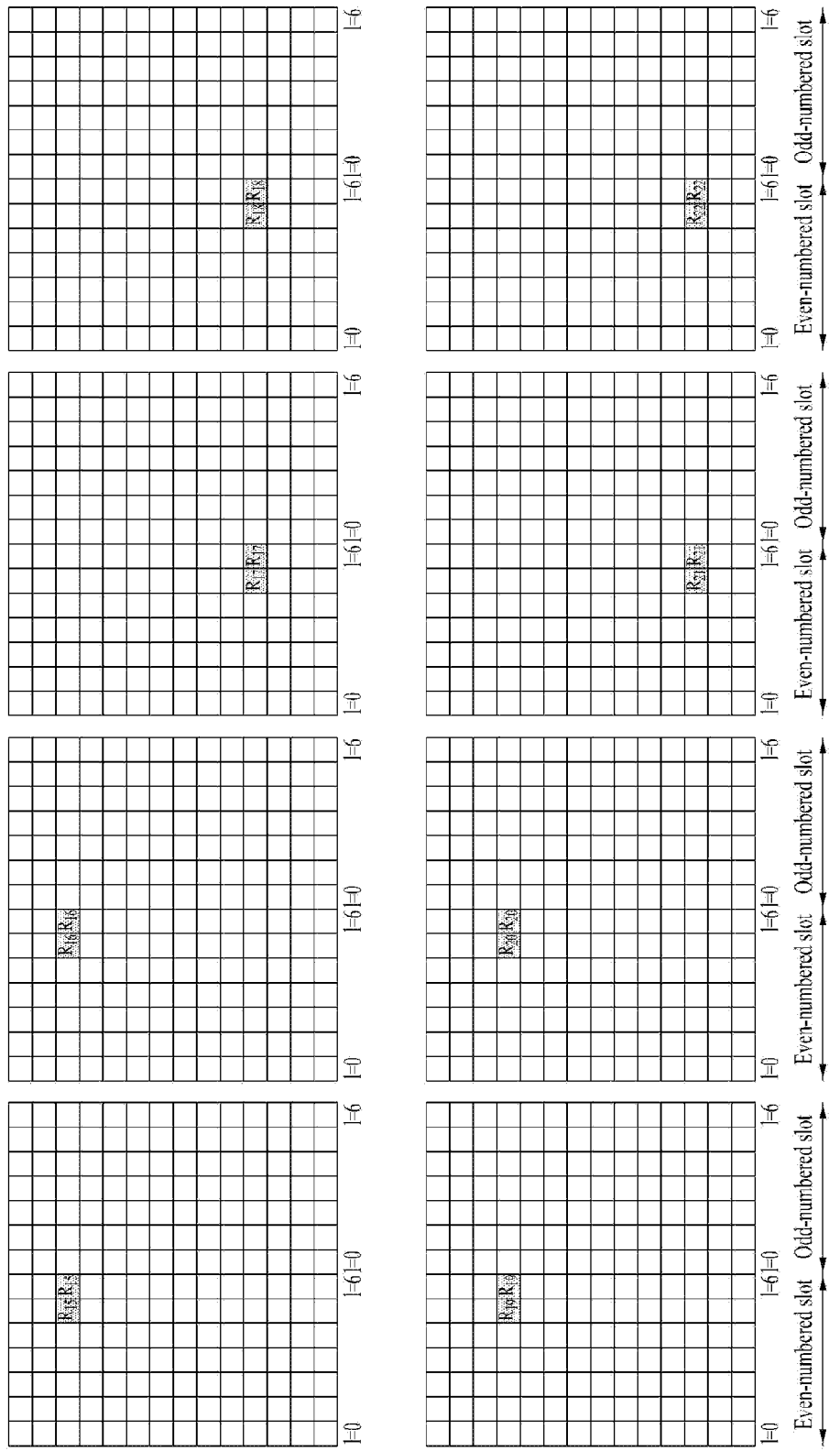
FIG. 6 is a view referred to for describing Channel State Information-Reference Signal (CSI-RS)

CSI-RSs are mapped to REs on a per-antenna port basis according to a specific CSI-RS configuration by [Equation 1] and [Equation 2]. For example, in the case of CSI-RS Configuration 0, CSI-RSs are mapped in the manner illustrated in FIG. 6.

As described before, CSI-RSs are transmitted in a specific subframe, not in every subframe. Specifically, CSI-RSs may be transmitted in a subframe satisfying the following [Equation 3], referring to a CSI-RS subframe configuration as illustrated in [Table 2] below.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

$$(10 n_f + \lfloor n_s/2 \rfloor - \Delta_{CSI-RS}) \bmod T_{CSI-RS} = 0 \quad [\text{Equation 3}]$$

In [Table 2], $T_{CSI-RS}$ is a transmission period of CSI-RSs, $\Delta_{CSI-RS}$ is an offset, $n_f$ is a system frame number, and $n_s$ is a slot number.

Coordinated Multi-Point (CoMP)

To satisfy enhanced system performance requirements for the 3GPP LTE-A system, CoMP transmission and reception technology known as co-MIMO, collaborative MIMO or network MIMO has been proposed. The CoMP technology can increase the performance of UEs located at a cell edge and average sector throughput.

It is known that Inter-Cell Interference (ICI) generally degrades the performance of a UE at a cell edge and an average sector throughput in a multi-cellular environment with a frequency reuse factor of 1. To offer an appropriate throughput performance to a cell-edge UE in an environment constrained by interference, a simple ICI mitigation technique such as UE-specific power control-based Fractional Frequency Reuse (FFR) is used in the legacy LTE system. However, it may be preferred to reduce the ICI or reuse the ICI as a desired signal for the UE, rather than to decrease the utilization of frequency resources per cell. For this purpose, CoMP transmission techniques may be adopted.

DL CoMP schemes are classified largely into Joint Processing (JP), and Coordinated Scheduling/Beamforming (CS/CB).

According to the JP scheme, each point (eNB) of a CoMP cooperation unit may use data. The CoMP cooperation unit refers to a set of eNBs used for a CoMP transmission operation. The JP scheme is further branched into joint transmission and dynamic cell selection.

Joint transmission is a technique of transmitting PDSCHs from a plurality of points (a part or the whole of a CoMP cooperation unit) at one time. That is, a plurality of transmission points may simultaneously transmit data to a single UE. The joint transmission scheme can improve the quality of a received signal coherently or non-coherently and actively eliminate interference with other UEs, as well.

Dynamic cell selection is a technique of transmitting a PDSCH from one point of a CoMP cooperation unit at one time. That is, one point of the CoMP cooperation unit transmits data to a single UE at a given time point, while the other points of the CoMP cooperation unit do not transmit data to the UE at the time point. A transmission point to transmit data to a UE may be dynamically selected.

Meanwhile, in the CS/CB scheme, a CoMP cooperation unit may perform cooperative beamforming for data transmission to a single UE. While only a serving cell transmits data to the UE, user scheduling/beamforming may be determined through coordination among cells of the CoMP cooperation unit.

UL CoMP reception refers to reception of a UL signal through cooperation among a plurality of geographically separate points. UL CoMP schemes include Joint Reception (JR) and Coordinated Scheduling/Beamforming (CS/CB).

In JR, a plurality of reception points receive a signal transmitted on a PUSCH. CS/CB is a technique in which while only one point receives a PUSCH, user scheduling/beamforming is determined through coordination among cells of a CoMP cooperation unit.

In this CoMP system, multi-cell eNBs can support data for a UE. In addition, the eNBs support one or more UEs simultaneously in the same radio frequency resources, thereby increasing system performance. The eNBs may also operate in Space Division Multiple Access (SDMA) based on CSI between a UE and the eNBs.

A serving eNB and one or more cooperative eNBs are connected to a scheduler through a backbone network in the CoMP system. The scheduler may receive channel information about the channel states between a UE and the cooperative eNBs, measured by each cooperative eNB and operate based on the channel information. For example, the scheduler may schedule information for cooperative MIMO for the serving eNB and the one or more cooperative eNBs. That is, the scheduler may transmit a command directly to each eNB in regard to the cooperative MIMO operation.

As noted from the above description, it can be said that a CoMP system operates as a virtual MIMO system by grouping a plurality of cells into one group. Basically, the CoMP system adopts a MIMO communication scheme using multiple antennas.

Measurement Report

A measurement report is used for many techniques designed to ensure the mobility of UEs (handover, random access, cell search, etc.) or for one of the techniques. Since the measurement report needs a certain degree of coherent demodulation, a UE may perform measurement after acquiring synchronization and physical layer parameters, except for measurement of a received signal strength.

The measurement report may include a measurement such as Reference Signal Received Power (RSRP), Received Signal Strength Indicator (RSSI), and Reference Signal Received Quality (RSRQ), etc.

RSRP is a measurement that may be acquired by measuring the magnitude of DL CRSs. RSSI is defined as the total received power of a UE, including interference and noise power from neighbor cells. RSRQ is defined as (NxRSRP/RSSI), where N is the number of RBs over the measurement bandwidth of RSSI.

Transmission of a measurement report may be determined based on the following conditions for event-based measurement report decision:

i) when the measurement of a serving cell becomes larger than an absolute threshold;

ii) when the measurement of the serving cell becomes smaller than the absolute threshold;

iii) when the measurement of a neighbor cell becomes larger than the measurement of the serving cell by an offset;

iv) when the measurement of the neighbor cell becomes larger than the absolute threshold; and v) when the measurement of the serving cell becomes smaller than the absolute threshold and the measurement of the neighbor cell becomes larger than another absolute threshold.

Herein, the measurements may be the afore-described RSRP values.

Alternatively, it may be regulated that a measurement report is transmitted only when each of the above-described conditions for measurement report decision is kept satisfied for a predetermined time or longer.

Condition iii) for deciding whether to transmit a measurement report will be described in detail with reference to FIG. 7. A UE continuously measures RSRPs of a serving cell and a neighbor cell. As the UE approaches the neighbor cell, the RSRP of the neighbor cell gets larger than the RSRP of the serving cell by an offset at time t1. A predetermined time-to-trigger later, that is, at time t2, the UE may transmit a measurement report to the serving cell. The offset and the predetermined time-to-trigger may be set by a network.

Handover

A detailed description will be given of a handover procedure and a random access procedure in an LTE system.

Figure 8:
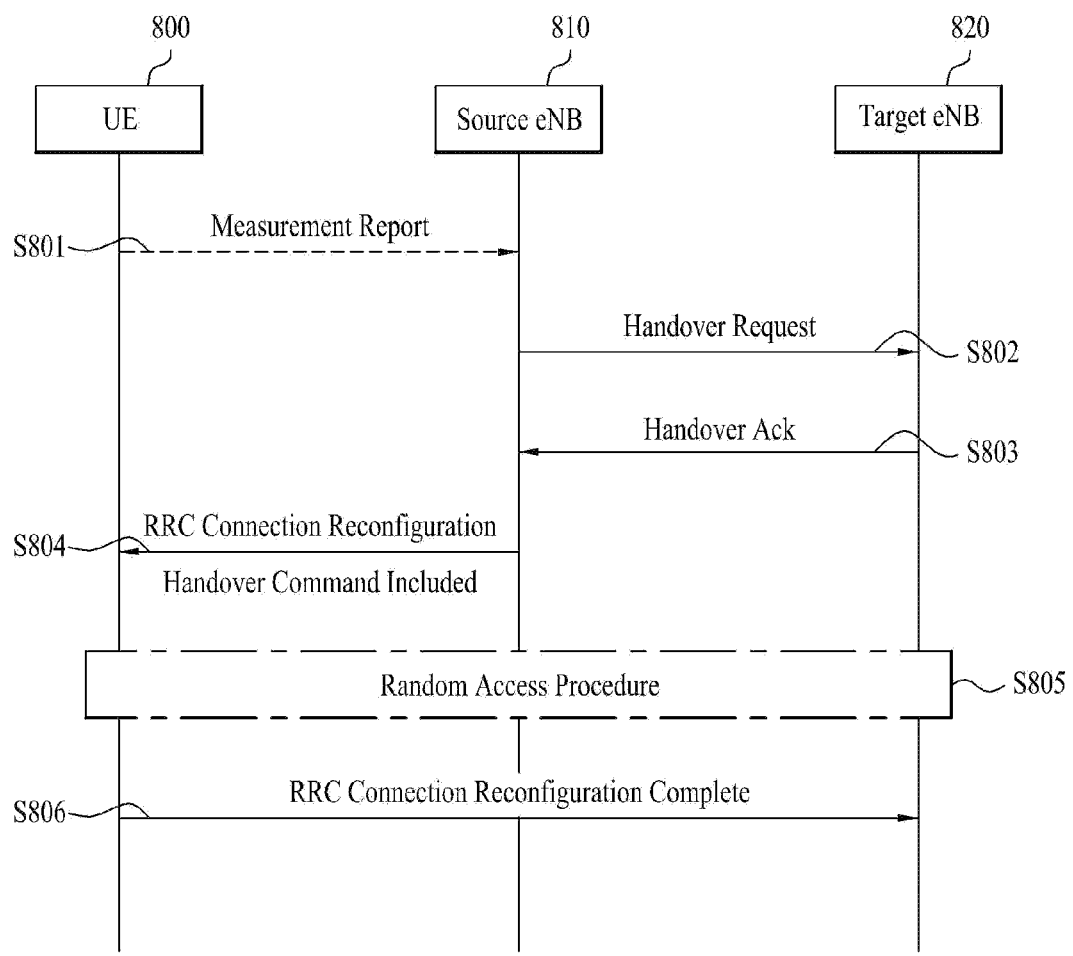
FIG. 8 is a diagram illustrating a signal flow for a handover procedure.

FIG. 8 is a diagram illustrating a signal flow for a handover procedure. Referring to FIG. 8, a UE 800 monitors measurements of a serving eNB 810 and neighbor cells. Upon generation of a handover trigger, the UE 800 transmits a Measurement Report message to the serving eNB 810 (S801).

Upon receipt of the measurement report from the UE 800, the serving eNB 810 transmits a Handover Request message to a target eNB 820 (S802). At the same time, the serving eNB 810 provides the target eNB 820 with Radio Resource Control (RRC) context information about the UE 800.

The target eNB 820 determines whether to accept the handover request for the UE based on the RRC context information. If the target eNB 820 determines to accept the handover request for the UE, the target eNB 820 generates a handover command and the serving eNB 810 transmits an RRC Connection Reconfiguration message including a handover command to the UE 800 (S804). The RRC Connection Reconfiguration message may include radio resource configuration information, a security configuration, and a C-RNTI, which are common to UEs within the service coverage of the target eNB 820.

Upon receipt of the RRC Connection Reconfiguration message, the UE 800 starts a random access procedure with the target eNB 820 (S805). If the random access procedure is successfully completed, the UE 800 ends the handover procedure by transmitting an RRC Connection Reconfiguration Complete message to the target eNB 820 (S806).

Random Access

Now, the random access procedure in the handover procedure will be described below in detail. A UE may perform the random access procedure in the system in the following cases:

when the UE initially accesses an eNB without an RRC connection to the eNB;

when the UE initially accesses a target cell in the handover procedure;

when the random access procedure is requested by a command from an eNB;

when UL data is generated without UL time synchronization or without allocation of radio resources configured for requesting radio resources; or in a recovery procedure triggered by a radio link failure or a handover failure.

A general contention-based random access procedure in the above cases will be described below.

Figure 9:
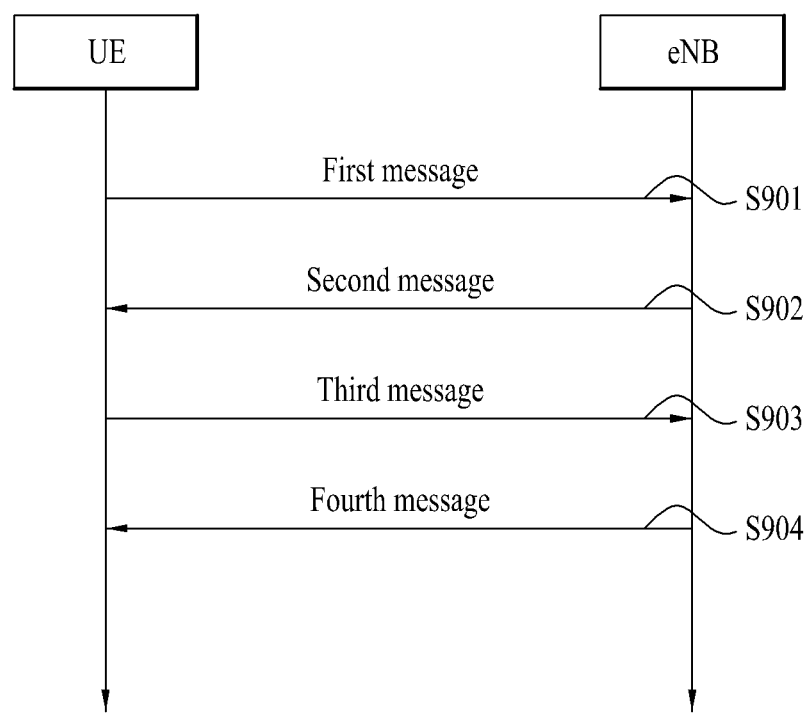
FIG. 9 is a diagram illustrating a signal flow for a random access procedure.

FIG. 9 is a diagram illustrating a signal flow for a contention-based random access procedure between a UE and an eNB.

(1) Transmission of First Message

A UE may randomly select a random access preamble from a set of random access preambles indicated by system information or a Handover Command, select Physical RACH (PRACH) resources, and transmit the random access preamble in the PRACH resources (S901).

(2) Reception of Second Message

After transmitting the random access preamble, the UE attempts to receive its random access response within a random access response reception window indicated by system information or the Handover Command received from an eNB (S902). More specifically, the random access response may be transmitted in a Medium Access Control (MAC) Packet Datagram Unit (PDU) and the MAC PDU may be transmitted on a PDSCH. To properly receive the information on the PDSCH, the UE preferably monitors a PDCCH. That is, the PDCCH preferably carries information about a UE to receive the PDSCH, frequency and time information about radio resources of the PDSCH, and information about a transport format of the PDSCH. Once the UE succeeds in receiving its PDCCH, the UE may properly receive the random access response on the PDSCH based on the information of the PDCCH. The random access response may include a Random Access Preamble IDentifier (RAPID), a UL Grant indicating UL radio resources, a Temporary C-RNTI, and a Timing Advance Command (TAC).

As described before, the reason for including the RAPID in the random access response is that since one random access response may include random access response information for one or more UEs, it is necessary to indicate a UE to which the UL Grant, the Temporary C-RNTI, and the TAC are valid. It is assumed in this step that the UE selects an RAPID identifying the random access preamble that has been selected in step S902. Thus, the UE may receive the UL Grant, the Temporary C-RNTI, and the TAC in the random access response.

(3) Transmission of Third Message

If the UE receives the random access response valid to the UE, the UE processes the information included in the random access response. That is, the UE applies the TAC and stores the Temporary C-RNTI. In addition, the UE may store transmission data in a message-3 buffer in response to the reception of the valid random access response.

The UE transmits the data (i.e. a third message) to the eNB based on the received UL Grant (S903). The third message should include an ID of the UE. In the contention-based random access procedure, the eNB may not determine which UE is performing the random access procedure and thus should identify the UE, for contention resolution.

Two methods have been discussed to include a UE ID in the third message. One of the methods is that if the UE has a valid C-RNTI already allocated by a corresponding cell before the random access procedure, the UE transmits the C-RNTI by a UL signal corresponding to the UL Grant. On the other hand, if the UE has not been allocated to the valid C-RNTI before the random access procedure, the UE transmits its ID (e.g., an SAE Temporary Mobile Subscriber Identity (S-TMSI) or a Random ID) in the third message. In general, a UE ID is longer than a C-RNTI. Once the UE transmits the data corresponding to the UL Grant, the UE starts a Contention Resolution (CR) timer.

(4) Reception of Fourth Message

After transmitting the data including its ID according to the UL Grant included in the random access response, the UE awaits reception of a command from the eNB, for contention resolution. That is, the UE attempts to receive a PDCCH in order to receive a specific message (S904). Two methods are available in receiving a PDCCH. As described before, if the third message transmitted in response to the UL Grant includes the C-RNTI, the UE attempts to receive a PDCCH using its C-RNTI. If the third message includes the UE ID, the UE may attempt to receive a PDCCH using the Temporary C-RNTI included in the random access response. In the former case, if the UE receives a PDCCH using its C-RNTI before the CR timer expires, the UE ends the random access procedure, determining that the random access procedure is successful. In the latter case, if the UE receives a PDCCH using the Temporary C-RNTI before the CR timer expires, the UE reads data received on a PDSCH indicated by the PDCCH. If the data includes the UE ID, the UE ends the random access procedure, determining that the random access procedure is successful.

In the case of non-contention-based random access, the random access procedure ends just by transmission of the first and second messages, compared to the contention-based random access procedure illustrated in FIG. 9. Note that before the UE transmits a random access preamble as the first message to the eNB, the eNB allocates the random access preamble to the UE. Thus the UE transmits the allocated random access preamble as the first message to the eNB and receives a random access response from the eNB, thus ending the random access procedure.

Now a description will be given of a method for transmitting a measurement report according to an embodiment of the present invention applicable to the afore-described CoMP system.

Basically, measurement reporting is performed using CRS. In an embodiment of the present invention, measurement reporting may be performed using one or a selective combination of CRS, CSI-RS, and DMRS. Herein, measurement reporting covers Radio Resource Management (RRM) measurement such as RSRP or RSRQ measurement, that is, measurement of signal strengths or signal strengths to total reception power of a serving cell and neighbor cells, and RLM measurement, that is, link quality measurement of the serving cell for use in determining whether a radio link failure has occurred. For example, RRM/RLM measurement is performed based on CRS at present. However, RRM/RLM measurement is possible based on CSI-RS, DMRS, etc. in the present invention. The signal strength of the serving cell, measured as an RSRP may be used for CSI measurement for link adaptation.

Measurement reporting may also be performed with respect to a specific antenna port(s) from among antenna ports through which RSs are transmitted or with respect to a specific RS configuration (e.g., a plurality of CSI-RS configurations may be allocated to the same subframe, and each CSI-RS configuration may include CSI-RSs for 2, 4, or 8 ports which may be transmitted at different time points).

A subframe set subjected to measurement reporting may be specified. For example, total subframes may be divided into a plurality of subframe sets and measurement reporting may be performed using a different RS for each subframe set, using a different RS type for each subframe, or using a different antenna port/RS configuration for each subframe.

The above methods may be used independently or in combination for measurement reporting. In this case, a configuration needs to be signaled to a UE. For example, if a plurality of transmission points (or a serving cell including one or more transmission points, a neighbor cell including one or more transmission points, etc.) are subjected to measurement reporting in a CoMP system and are allocated to antenna ports for transmission of different CSI-RSs, set by a CSI-RS configuration (e.g., a 4-port CSI-RS configuration, an 8-port CSI-RS configuration, etc.), a transmission point (or a network) needs to indicate to the UE that measurement reporting is based on CSI-RS and to indicate an antenna port for measurement, included in the specific CSI-RS configuration to the UE. In the presence of a plurality of transmission points, a plurality of measurement sets for measurement reporting may be signaled to the UE.

How the above-described measurement reporting is performed in each cell environment will be described in detail.

In the CoMP system, measurement reporting may be performed based on CSI-RS. The following description will be given in the context of two transmission points (first and second transmission points) for CoMP. The first transmission point may correspond to an eNB and the second transmission point may correspond to a Remote Radio Head (RRH) in FIG. 10. A UE that performs measurement reporting may be one of UE1 and UE2 in FIG. 10 and UE2 will be described in detail in relation to measurement reporting about a neighbor cell.

In measurement reporting based on CSI-RS, the UE may measure the strengths of signals received from the first and second transmission points. The first and second transmission points may transmit CSI-RSs through different antenna ports, at different transmission timings, or according to different CSI-RS configurations. In other words, measurements about the transmission points may be distinguished by the CSI-RSs transmitted by the transmission points.

Specifically, the first and second transmission points may transmit CSI-RSs according to different CSI-RS subframe configurations. As described before with reference to [Table 2], the transmission period of a CSI-RS may be determined according to a CSI-RS subframe configuration applied to the CSI-RS. A CSI-RS may be transmitted every 5 ms (i.e. every 5 subframes) at minimum and every 80 ms (i.e. every 80 subframes) at maximum according to each CSI-RS subframe configuration. Different CSI-RS subframe configurations may be allocated to the first and second transmission points. In this case, the UE may transmit a measurement report about CSI-RSs of subframes corresponding to the CSI-RS subframe configuration of the first transmission point, as a measurement report about the first transmission point. Likewise, the UE may transmit a measurement report about CSI-RSs of subframes corresponding to the CSI-RS subframe configuration of the second transmission point, as a measurement report about the second transmission point. For the measurement reporting of the UE, the CSI-RS subframe configuration used for each transmission point needs to be signaled to the UE.

Meanwhile, the first and second transmission points may transmit CSI-RSs according to different CSI-RS configurations. For example, referring to [Table 3] being a part of the afore-described [Table 1], the first transmission point may transmit CSI-RSs using CSI RS configuration 0, whereas the second transmission point may transmit CSI-RSs using CSI RS configuration 2.

TABLE 3

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |

The first and second transmission points may be configured to transmit CSI-RSs through different antenna ports included in the same CSI-RS configuration. For example, if it is agreed that the first transmission point transmits CSI-RSs through antenna port 15 and the second transmission point transmits CSI-RSs through antenna port 16, measurement reports for the first and second transmission points may be distinguished by CSI-RSs. If each transmission point is configured to transmit a CSI-RS through a different antenna port, a measurement report for the transmission point may be identified by the CSI-RS despite the same CSI-RS subframe configuration and/or the same CSI-RS configuration used for the transmission points.

The CSI-RS-based measurement reporting may include a measurement such as the afore-described RSRP, RSRQ, RSSI, etc. In addition, the CSI-RS-based measurement reporting may also include RLM measurement for measuring the link quality of a serving cell. Specifically, measuring CSI-RSs received from each transmission point may amount to measuring the linear average power, that is, RSRP of REs carrying the RSs. Or measuring CSI-RSs received from each transmission point may amount to acquiring an RSRP from an RSRP, an RSSI, etc.

Measurement reporting for the case where the above-described first and second transmission points are located in a neighbor cell of a UE that performs measurement reporting, that is, neighbor-cell measurement reporting will be described below with reference to FIG. 10.

Figure 10:
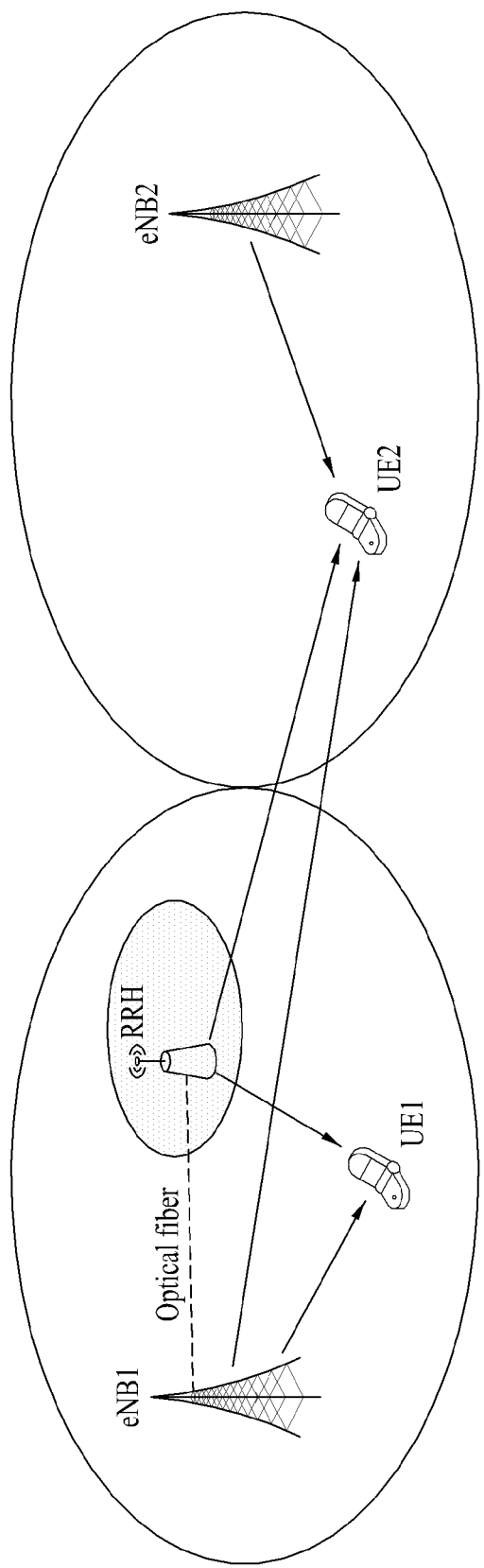
FIG. 10 illustrates measurement reporting about a neighbor cell.

In FIG. 10, the first transmission point (eNB) and the second transmission point (RRH) are located in a neighbor cell of a UE (UE2) that performs measurement-reporting. The first and second transmission points may have the same cell ID in CoMP scenario 4. In this case, if the UE measures CRSs, the first and second transmission points may not be distinguished from each other. If the second transmission point does not transmit a CRS, the UE may not recognize the second transmission point even though the second transmission point is nearby.

Under this environment, the first and second transmission points may be distinguished from each other by allocating different CSI-RS subframe configurations, CSI-RS configurations and/or CSI-RS antenna ports to the first and second transmission points. Specifically, a third transmission point (eNB2) may signal a CSI-RS configuration corresponding to each transmission point (or a CSI-RS antenna port configured/allocated to each transmission point in a specific CSI-RS configuration) to the UE (UE2), for measurement of each transmission point, so that the UE may use the CSI-RS configurations in measurement reporting about the neighbor cell. Thus, the third transmission point (eNB2) should indicate to the UE (UE2) that CSI-RSs are used in neighbor-cell measurement reporting about the first transmission point (eNB1) and should signal CSI-RS configurations of the first transmission point (eNB1) and each RRH covered by the cell of the first transmission point (eNB1) (or CSI-RS antenna ports configured/allocated to the transmission points in a specific CSI-RS configuration) to the UE (UE2). This may be done by higher-layer signaling (RRC signaling) or by adding a new field to signaling of a neighbor cell list.

In the case of CRS-based measurement reporting, the second transmission point may be configured to transmit only a CRS of a specific antenna port (e.g., antenna port 1), and when the third transmission point transmits a neighbor cell list to the UE, the third transmission point may signal use of CRSs transmitted through the other antenna ports except for antenna port 1 for measurement reporting about the first transmission point and use of a CRS transmitted through antenna port 1 for measurement reporting about the second transmission point, to the UE by an additional field. That is, measurement of each transmission point may be identified by a CRS antenna port.

In another embodiment of measurement reporting, DMRS may be used. More specifically, if a UE receives data from a transmission point by beamforming, CRS-based measurement may not be accurate for a serving cell because beamforming is not considered for CRSs. Accordingly, the UE may increase the measurement accuracy of an actual transmission link by DMRS-based measurement reporting.

The same thing may apply to CS/CB or dynamic cell selection in CoMP. For example, if a UE performs dynamic cell selection between first and second cells, the UE may reduce unnecessary cell switching by using DMRSs in measurement reporting for the dynamic cell selection. In the case of CRS-based measurement, channel state may be poor, whereas in the case of beamforming, channel state may be good due to formation of an appropriate beam for a UE. Therefore, if DMRS-based transmission takes place, CRS-based measurement may cause unnecessary cell switching and thus DMRS-based measurement is preferable.

CSI-RS-based cell portion mapping similar to the aforedescribed identification of a transmission point by CSI-RS will be described below. Cell portion mapping is a method for acquiring a cell distribution gain through the coverage of each RRH in a cell including RRHs connected by an optical fiber. A UE may identify a cell portion of a cell in the following manner. Herein, the term cell portion conceptually covers the remaining area controlled by an eNB except for the coverage of each RRH, as well as the coverage of each RRH illustrated in FIG. 11.

First, a different CSI-RS subframe configuration or a different CSI-RS configuration is allocated to each cell portion. In this case, the UE may identify a cell portion by determining a CSI-RS subframe configuration or a CSI-RS configuration applied to a CSI-RS. For this purpose, a transmission point (eNB1) of a cell divided into cell portions may signal the CSI-RS subframe configuration or CSI-RS configuration of each cell portion and the CSI-RS subframe configuration or CSI-RS configuration of the transmission point (eNB1) to a neighbor transmission point (eNB2, etc.) by X2 signaling. Upon receipt of this information, the neighbor transmission point (eNB2, etc.) may signal this information along with a neighbor cell list to UEs within the cell of the neighbor transmission point.

Secondly, a different CSI-RS antenna port may be allocated to each cell portion. Specifically, one CSI-RS configuration may be allocated to each cell and different CSI-RS antenna ports included in the CSI-RS configuration may be allocated to cell portions of the cell, to thereby enable identification of each cell portion. In this case, the CSI-RS configuration allocated to each cell should include antenna ports more than the number of cell portions of the cell. Thus, CSI-RS configuration 0 to CSI-RS configuration 9 and CSI-RS configuration 20 to CSI-RS configuration 25 illustrated in [Table 1] are available. A CSI-RS configuration may be signaled in the manner applied to the above first case.

If different random access resources are mapped to each cell portion as described later, the UE may perform random access on a cell portion basis.

First, a random access configuration may be allocated to each cell portion and the allocation may be broadcast in the cell by a System Information Block (SIB). This will be described with reference to [Table 4].

TABLE 4

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |

TABLE 4-continued

| PRACH Configuration Index | Preamble Format | System frame number | Subframe number |
|---|---|---|---|
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |

In [Table 4], transmission timings of a random access preamble being the first message are set for respective PRACH configuration indexes, for a random access procedure. The UE transmits a random access preamble at a timing corresponding to an index indicated by a higher-layer parameter Prach-ConfigurationIndex from among the configurations listed in [Table 4]. If a random access configuration is allocated on a cell portion basis and the UE is to perform a random access procedure with a specific cell portion, the UE may transmit a random access preamble at a timing indicated by a random access configuration corresponding to the specific cell portion. That is, a time at which random access is allowed may be set for each cell portion and different random access times may be set for different cell portions.

Secondly, a different random access preamble may be allocated to each cell portion and information about the random access preamble of each cell portion may be broadcast in the cell by an SIB, etc. Allocation of different random access preambles may mean use of different root sequences and cyclic shifts in generating random access preambles.

That is, the UE may perform random access to each cell portion in time division or code division in this method. The above-described two methods may apply individually or in combination.

Now a description will be given of a handover procedure according to an embodiment of the present invention based on the above descriptions, with reference to FIG. 11.

Figure 11:
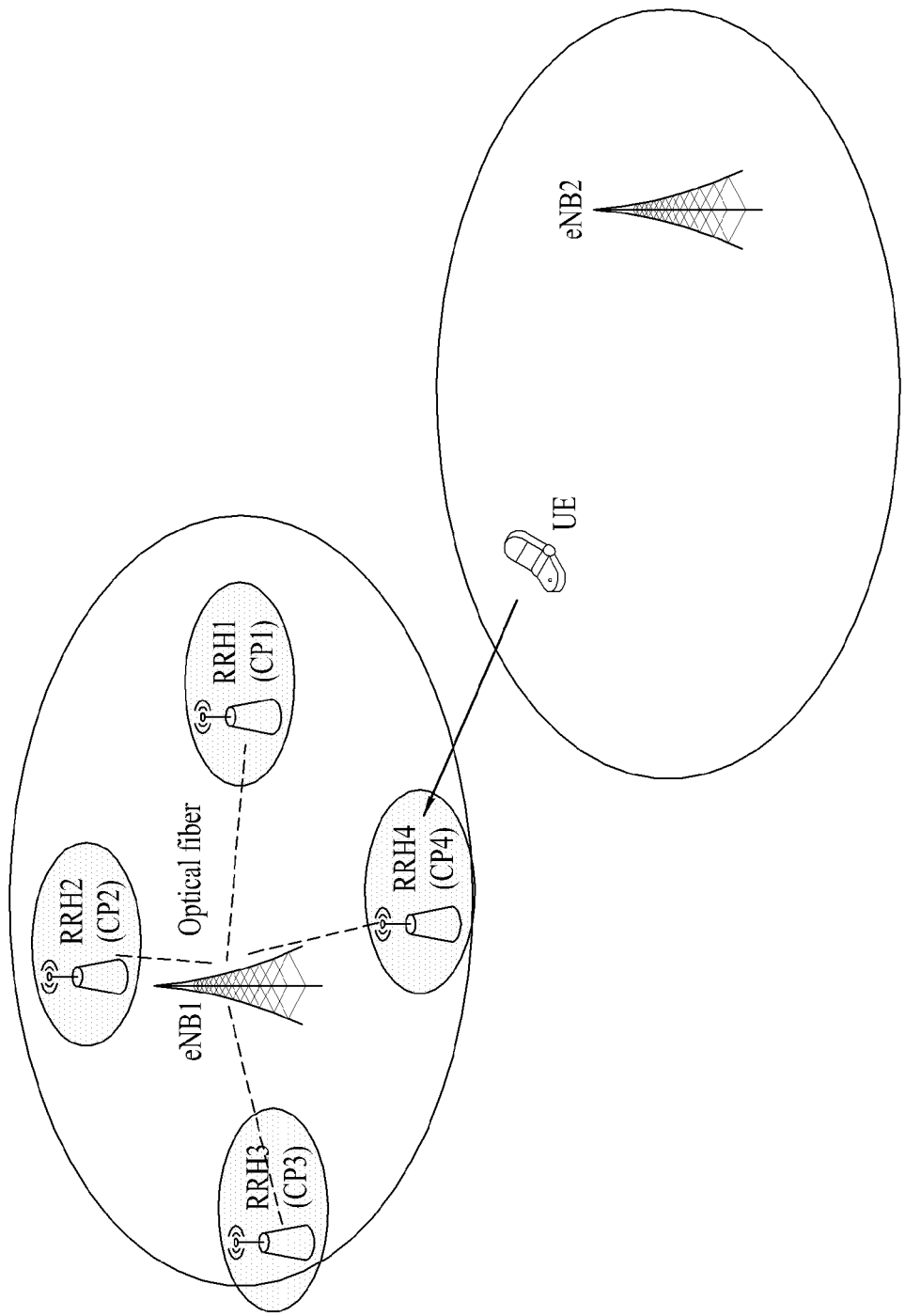
FIG. 11 is a view referred for describing a cell portion and its related handover.

Referring to FIG. 11, it is assumed that a UE belonging to the third transmission point (eNB2) is moving to the cell of the first transmission point (eNB1). Four transmission points RRH1 to RRH4 connected to the first transmission point (eNB1) are located in the cell of the first transmission point (eNB1) and CP1 to CP4 denote the coverage of the four transmission points RRH1 to RRH4, respectively.

In this environment, a handover procedure may be performed in the following manner.

The third transmission point (eNB2) receives information about the cell of the first transmission point (eNB1) from the first transmission point (eNB1) or the network. This information may include a cell ID, the number of cell portions, measurement information about each cell portion (e.g., a different CSI-RS configuration or a different CSI-RS antenna port allocated to each transmission point, as described before), an available random access preamble, etc. Herein, a new cell portion ID may be defined so that information may be transmitted between transmission points in conjunction with each other.

The third transmission point (eNB2) may transmit a neighbor cell list added with the received cell portion information to UEs in its cell. Or the cell portion information may be transmitted by RRC signaling, separately from the neighbor cell list.

A UE within the cell of the third transmission point (eNB2) measures about the cell portions of the cell of the first transmission point (eNB1). If any cell portion (e.g. CP4) satisfies a handover condition, the UE transmits a Handover Request message to the first transmission point (eNB1).

If handover to the target cell portion is decided, the first transmission point (eNB1) signals a random access preamble (or a random access configuration) allocated to the target cell portion (i.e. CP4) to the UE. If the UE is notified of the random access preamble or the random access configuration, when receiving the information about the cell of the first transmission point (eNB1), this operation may be omitted.

The UE performs a random access procedure with the cell portion (CP4) using the signaled random access preamble (or random access configuration). When transmission power is determined for transmission of the random access preamble, a CSI-RS-based measurement of the cell portion (CP4) may be considered as expressed in [Equation 4].

$$P_{PRACH} = \min\{P_{CMAX,c}(i), PREAMBLE\_RECEIVED\_TARGET\_POWER + PL_c\}[dBm]$$ [Equation 4]

where $P_{MAX,c}(i)$ is a maximum transmission power set for an $i^{th}$ subframe of a Primacy Cell (PCell) for the UE, PREAMBLE_RECEIVED_TARGET_POWER is a value received from a higher layer, and $PL_c$ is a DL path loss of the PCell, estimated by the UE, which is determined based on a CSI-RS measurement result of the target cell portion.

The above-described handover procedure may be performed by detecting a cell portion after handover as follows.

The UE first performs handover to the cell of the first transmission point (eNB1) in a conventional handover procedure. The first transmission point (eNB 1) may command the UE to measure about each cell portion, while signaling the afore-described cell portion information. Upon receipt of a measurement report from the UE, the first transmission point (eNB1) may include the UE in a specific cell portion (CP4) having a good measurement result.

In the environment illustrated in FIG. 11 (e.g., CoMP scenario 4 in which the first transmission point (eNB1) and the four transmission points RRH1 to RRH4 may have the same cell ID), the UE may perform an initial access procedure with the specific cell portion (CP4). In this case, system information signaled by a higher layer may include information about a cell ID, a CSI-RS configuration or CSI-RS antenna port allocated to each cell portion, a random access preamble or random access configuration for each cell portion, etc. so that the UE may perform random access to the specific cell portion (CP4). The UE may measure about each cell portion based on the cell portion information acquired from the system information and may determine a cell portion for random access and a random access preamble or random access configuration allocated to the cell portion based on the measurement result.

Figure 12:
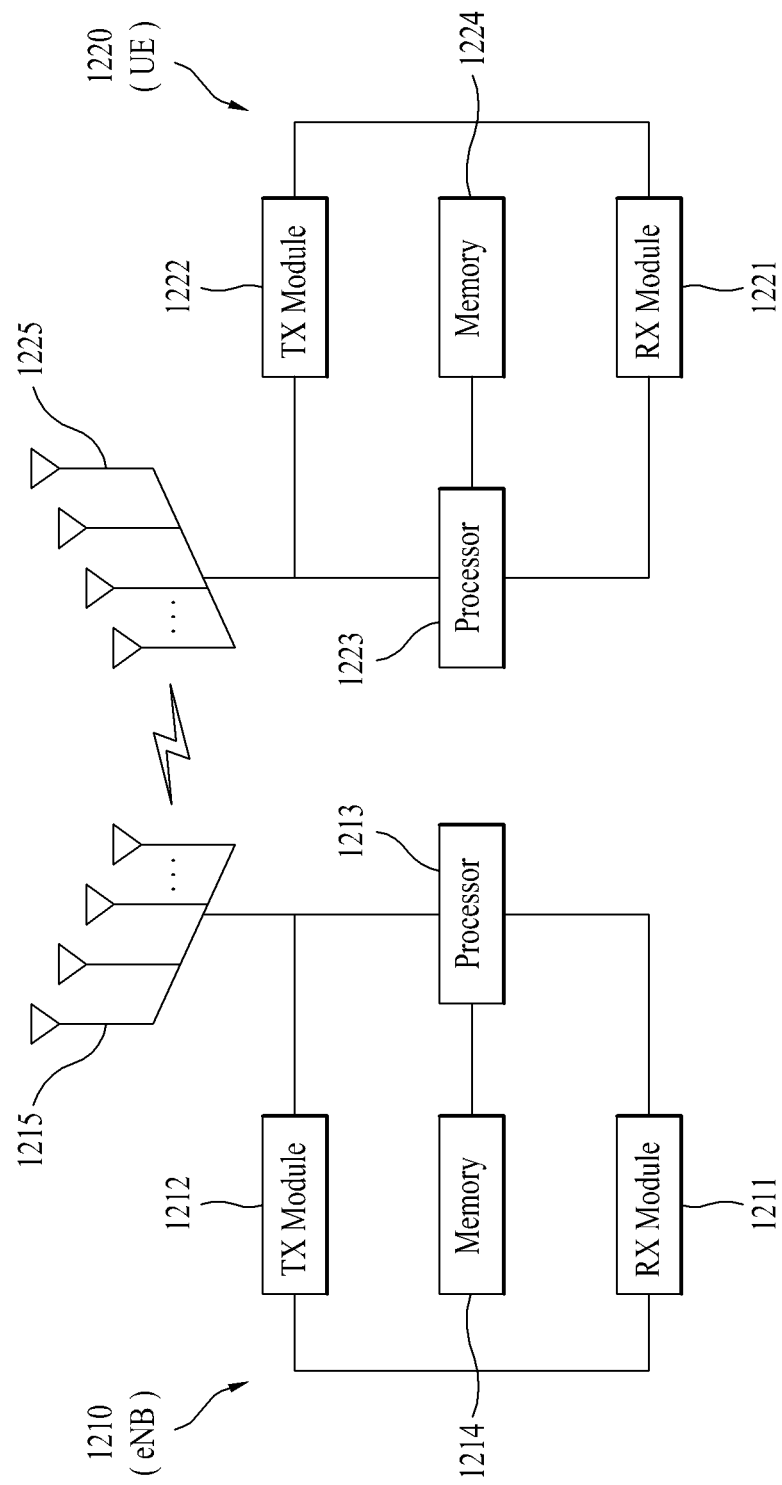
FIG. 12 is a block diagram of a transmission apparatus and a reception apparatus.

FIG. 12 is a block diagram of a transmission point and a UE according to an embodiment of the present invention.

Referring to FIG. 12, a transmission point 1210 according to the present invention may include an Rx module 1211, a Tx module 1212, a processor 1213, a memory 1214, and a plurality of antennas 1215. The plurality of antennas 1215 are used to support MIMO transmission and reception. The Rx module 1211 may receive uplink signals, data and information from a UE. The Tx module 1212 may transmit downlink signals, data and information to a UE. The processor 1213 may provide overall control to the operations of the transmission point 1210.

In accordance with an embodiment of the present invention, the processor 1213 of the transmission point 1210 may process necessary information in the afore-described measurement report, handover, random access, etc.

Besides, the processor 1213 processes information received by the transmission point 1210 and information to be transmitted from the transmission point 1210. The memory 1214 may store the processed information for a predetermined time and may be replaced with a component such as a buffer (not shown).

With continued reference to FIG. 12, a UE 1220 according to the present invention may include an Rx module 1221, a Tx module 1222, a processor 1223, a memory 1224, and a plurality of antennas 1225. The plurality of antennas 1225 are used to support MIMO transmission and reception. The Rx module 1221 may receive downlink signals, data and information from an eNB. The Tx module 1222 may transmit uplink signals, data and information to an eNB. The processor 1223 may provide overall control to the operations of the UE 1220.

In accordance with an embodiment of the present invention, the processor 1223 of the UE 1220 may process necessary information in the afore-described measurement report, handover, random access, etc.

Besides, the processor 1223 processes information received by the UE 1220 and information to be transmitted from the UE 1220. The memory 1224 may store the processed information for a predetermined time and may be replaced with a component such as a buffer (not shown).

One or more of the above-described embodiments of the present invention may apply to the configurations of the transmission point and the UE, independently or in combination. Redundant descriptions are avoided for clarity.

The description of the transmission point 1210 may apply to a relay as a DL transmission entity or a UL reception entity, and the description of the UE 1220 may apply to the relay as a DL reception entity or a UL uplink transmission entity in FIG. 12.

The embodiments of the present invention may be achieved by various means, for example, hardware, firmware, software, or a combination thereof.

In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention are applicable to various mobile communication systems.

The invention claimed is:

1. A method for performing measurement reporting at a User Equipment (UE) in a wireless communication system, the method comprising:
   receiving, from a serving cell, a neighboring cell list;
   measuring channel state information (CSI) using a first CSI-reference signal (CSI-RS) from the serving cell;
   reporting a result of the CSI measurement to the serving cell;
   measuring radio resource management (RRM) using a second CSI-RS from a neighboring cell;
   reporting a result of the RRM measurement to the serving cell; and
   transmitting a random access preamble to a neighboring cell based on an equation min{Pcmax, PRTP+PLc}, where Pcmax is maximum transmission power allowed to the UE, PRTP is preamble received target power, and PLc is pathloss determined based on a result of the RRM measurement of the second CSI-RS,
   wherein the first CSI-RS and the second CSI-RS belong to a specific CSI-RS configuration and are transmitted with different CSI-RS antenna port numbers of the specific CSI-RS configuration by the serving cell and the neighboring cell respectively, and
   wherein the serving cell and the neighboring cell are distinguished from each other by the different CSI-RS antenna port numbers, the different CSI-RS antenna port numbers being signaled by the neighbor cell list.

2. The method according to claim 1, wherein the serving cell and the neighboring cell perform cooperative transmission for the UE.

3. The method according to claim 1, wherein the second CSI-RS signal is transmitted from a first transmission point of the neighboring cell.

4. The method according to claim 3, further comprising:
   receiving a third CSI-RS signal from a second transmission point of the neighboring cell,
   wherein the UE recognizes each of the transmission points that transmit the second CSI-RS and the third CSI-RS respectively using at least one of CSI-RS subframe configurations, CSI-RS configurations, and CSI-RS antenna ports.

5. The method according to claim 1, further comprising:
   receiving information about an antenna port used for transmitting for the first CSI-RS from the serving cell.

6. The method according to claim 1, further comprising:
   receiving a CSI-RS subframe configuration used for transmitting the first CSI-RS from the serving cell.

7. The method according to claim 1, wherein the RRM measurement includes a reference signal received strength (RSRP) of the second CSI-RS.

8. The method according to claim 1, wherein a magnitude of the second CSI-RS is measured by calculating a linear average of power of resource elements carrying the second CSI-RS, total reception power, and a number of resource blocks in a corresponding bandwidth, used for measuring the total reception power.

9. A User Equipment (UE) for performing measurement reporting in a wireless communication system, the UE comprising:
   a transmitter; and
   a processor operatively connected to the transmitter and configured to:

receive, from a serving cell, a neighboring cell list,
measure channel state information (CSI) using a first CSI-reference signal (CSI-RS) from the serving cell,
report a result of the CSI measurement to the serving cell,
measure radio resource management (RRM) using a second CSI-RS from a neighboring cell,
report a result of the RRM measurement to the serving cell, and
transmit a random access preamble to a neighboring cell based on an equation min{Pcmax, PRTP+PLc}, where Pcmax is maximum transmission power allowed to the UE, PRTP is preamble received target power, and PLc is pathloss determined based on a result of the RRM measurement of the second CSI-RS,
wherein the first CSI-RS and the second CSI-RS belong to a specific CSI-RS configuration and are transmitted with different CSI-RS antenna port numbers of the specific CSI-RS configuration by the serving cell and the neighboring cell respectively, and
wherein the serving cell and the neighboring cell are distinguished from each other by the different CSI-RS antenna port numbers, the different CSI-RS antenna port numbers being signaled by the neighbor cell list.

* * * * *